United States Patent [19]
Pan

[11] Patent Number: 5,924,726
[45] Date of Patent: Jul. 20, 1999

[54] FASTEN-ON SUPPLEMENTAL RESTRAINT SYSTEM

[75] Inventor: Yue Ming Pan, Taipei, Taiwan

[73] Assignee: Tina Chen, North Potomac, Md.

[21] Appl. No.: 08/862,619

[22] Filed: May 23, 1997

[51] Int. Cl.$^6$ .................................................. B60R 21/18
[52] U.S. Cl. ............................................................ 280/733
[58] Field of Search ............................................ 280/733

[56] References Cited

U.S. PATENT DOCUMENTS

| | | | |
|---|---|---|---|
| 4,971,354 | 11/1990 | Kim | 280/733 |
| 5,062,662 | 11/1991 | Cameron | 280/733 |
| 5,242,193 | 9/1993 | Humpal | 280/733 |
| 5,333,902 | 8/1994 | Hatfield | 280/733 |
| 5,472,231 | 12/1995 | France | 280/733 |

*Primary Examiner*—Kenneth R. Rice
*Attorney, Agent, or Firm*—Bacon & Thomas, PLLC

[57] ABSTRACT

A fasten-on supplemental restraint system comprising a detecting circuitry and an air bag assembly is provided. The supplemental restraint system is independently located in the vehicle and works with the existing safety belt system. The supplemental restraint system can be readily attached by means of buckle so that the air bag assembly can be readily placed in front of the driver/passenger. Once the air bag body of the air bag assembly is inflated, the direction of expansion is directed forward and outward from the driver/passenger. With this arrangement, the potential risk of being injured by the deployment of the air bag body is therefore eliminated.

8 Claims, 9 Drawing Sheets

FASTEN-ON SUPPLEMENTAL RESTRAINT SYSTEM

BACKGROUND OF THE INVENTION

1. Field of the Invention

The present invention relates to a supplemental restraint system for vehicles, more particularly to a system that can be used in combined with safety belt and be fastened-on by the driver and/or the passengers as a restraint system serving as supplemental protection from injury in case of accidental impact.

2. Description of Prior Art

Air bag has become one of the standard equipments for most cars and is intended to protect the driver and/or the passengers from injury upon accidental impact. In the beginning, only single air bag was embedded into the steering wheel. Recently, passenger air bags, side air bags and rear seat bags have also been developed and installed in suitable positions within the automobile. In the United States, protection to the lower limbs has been emphasized in recent years. This brought about the introduction of the lap air bag for protection the knees.

A leading auto company, Mercedes Benz, has announced an "X-bag Studie" wherein about seventeen air bags are installed within an experimental model. The air bags are installed under the dashboard, within the four doors, ceiling, back of front seats, under the headrest and in the front and lap portion of rear seats. In such a case, almost the entire compartment is fitted with air bags intended to provide a safer environment to the driver and passengers from the shock caused by the vehicle's possible high speed collision. However, the safety of the air bag is still a controversial issue since many drivers and/or passengers claim that their eyes and/or face have been injured by the explosive deployment of the air bag. Furthermore, there was a case reported that an infants neck was pushed broken by an inflated air bag. Because of these problems, there is still a need to improve the current air bag design.

The conventional air bag which is normally embedded in the steering wheel and the dashboard has a potential risk to the driver and passenger. Once the air bag is deployed, the explosive force of the inflated bag projects toward the face of the driver and the passenger and can possibly cause injury to them. Moreover, the conventional air bag is fixedly embedded in the steering wheel or on the dashboard wherein the relative position between the driver/passenger cannot be adjusted. If the driver/passenger has a shorter or smaller figure, or they ignore to buckle up the safety belt, they are likely to get injured on their face and eyes, due to insufficient space between their body and the air bag.

Furthermore, for cars equipped with more than two air bags, unless a sensor is installed in the passengers seat, all of the air bags would be deployed in case of collision. Once the air bags are deployed, the steering wheel, dashboard and/or other areas where the air bags are installed will be blown out leaving an unsightly hole. Consequently, the repair and replacement of the air bags, steering wheel, dashboard and/or other areas that contained air bags will be quite expensive. For example, the cost to repair the two front air bags for the Chrysler Concord is about USD3,500, which is quite a financial burden for the owner. Accordingly, the expensive cost of installing and repairing air bags will limit the prevalence of the air bag.

In order to minimize the above mentioned risk of the air bag, new car models (1997), have been incorporated with extra safety systems to serve as the reciprocator of air bag. The pre-tensioner system of the safety belt is one example. In the pre-tensioner system, an explosive package or a pre-tensioner apparatus is packed in the collar of the safety belt. Once the car collides exceeding certain speed, the explosives or the pre-tensioner apparatus will be ignited, this generates a retracting force to hold the driver/passenger back to the seat. The pre-tensioner system and safety belt help the driver/passenger remain in the seat at the time of collision which minimizes the risk of bumping into the steering wheel and/or dashboard. This also reduces the possibility of being injured by the inflated air bag even if the air bag is deployed.

Another auxiliary system is to install a sensor under the passenger seat. The sensor insures that the passenger side air bag will not be deployed in the collision if there is no passenger on the seat. This auxiliary sensor helps to reduce the cost of repairing and replacing the hole left by the deployed air bag.

SUMMARY OF THE INVENTION

A main objective of this invention is to provide a detachable fasten-on supplemental restraint system wherein the air bag package is designed in combination with the safety belt and is readily attachable and detachable to and from its mounting console rather than fixedly embedded in the steering wheel or dashboard as the conventional air bag.

Another objective of this invention is to provide a fasten-on supplemental restraint system wherein the air bag is designed to have an unique shape and is made of special material, so that the air bag may provide active protection to the driver/passenger while the conventional air bag only provides passive protection.

A further objective of this invention is to provide a fasten-on supplemental restraint system wherein the air bag can be manufactured in different sizes and dimensions to meet requirements for different users, so that each user may easily select a suitable one accordingly. In the light of this, even a pregnant woman may find a suitable one to protect her bulgy abdomen. With this arrangement, injury to the face and/or head resulting from improper one-sized air bag can be minimized or even eliminated. This unique advantage is much meaningful especially for the women, children and those people with smaller figures.

A still further objective of this invention is to provide a fasten-on supplemental restraint system wherein the air bag assembly is independent of the major parts of the car and can be readily attached to the safety belt by means of a plug-in design. In assembling or replacing, the air bag assembly can be easily conducted by the driver without any special tools nor skillfil technique. Consequently, considerable cost is reduced.

A still further objective of this invention is to provide a supplemental restraint system wherein when in case of no passenger, the air bag will remain intact without the possibility of being accidentally deployed. Furthermore, sensor under the passenger seat will be no more required, and thus reduce the cost.

BRIEF DESCRIPTION OF DRAWINGS

In order to be more readily understood the present invention, the following description of the illustrations are offered.

DETAILED DESCRIPTION OF PREFERRED EMBODIMENTS

Figure 1:
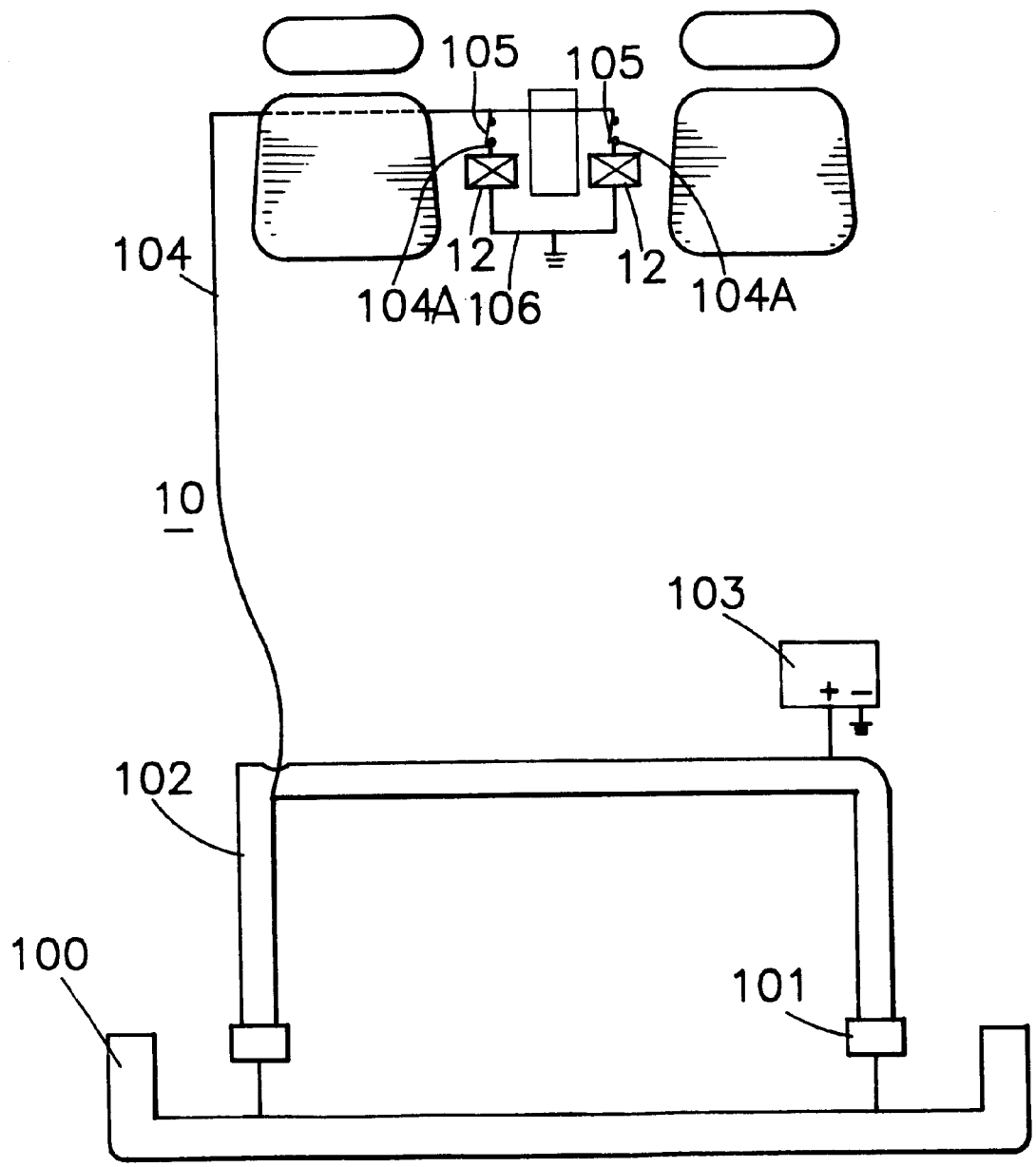
FIG. 1 is the detecting circuit of a fasten-on supplemental restraint system made according to the present invention.
Figure 2:
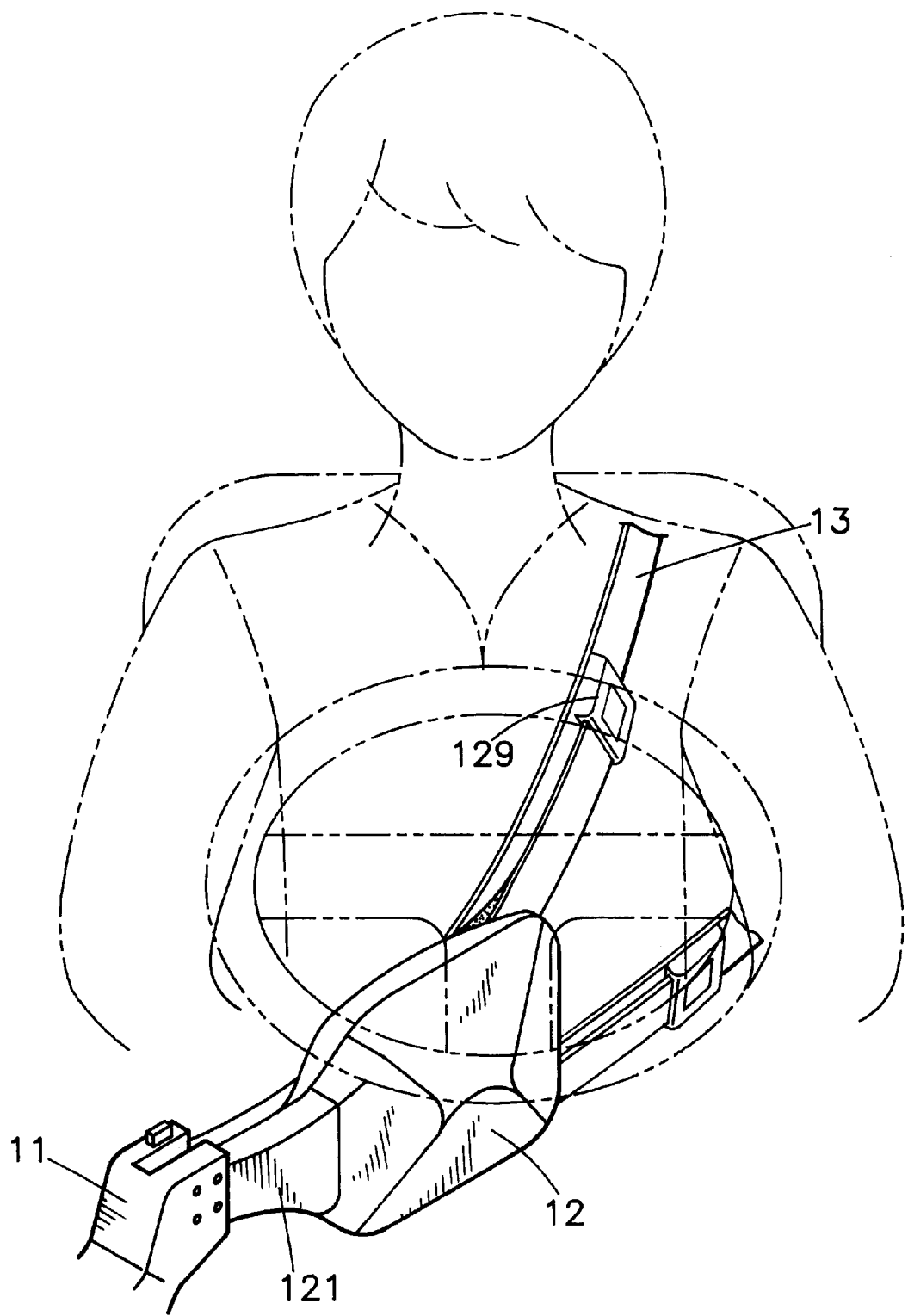
FIG. 2 is a perspective and schematic view showing a fasten-on supplemental restraint system is in use.
Figure 3:
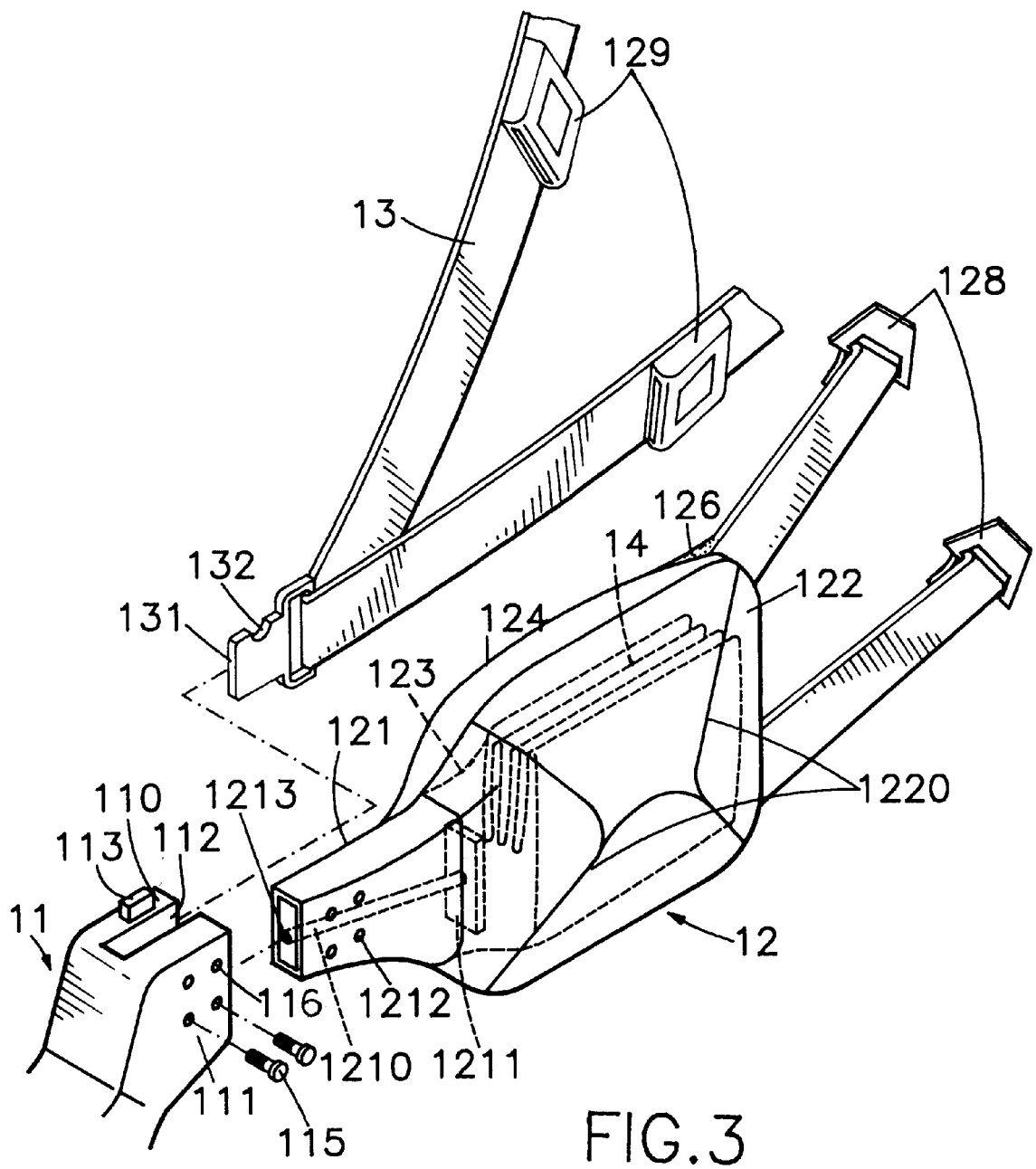
FIG. 3 is an enlarged view of the fasten-on supplemental restraint system shown in FIG. 2.
Figure 3A:
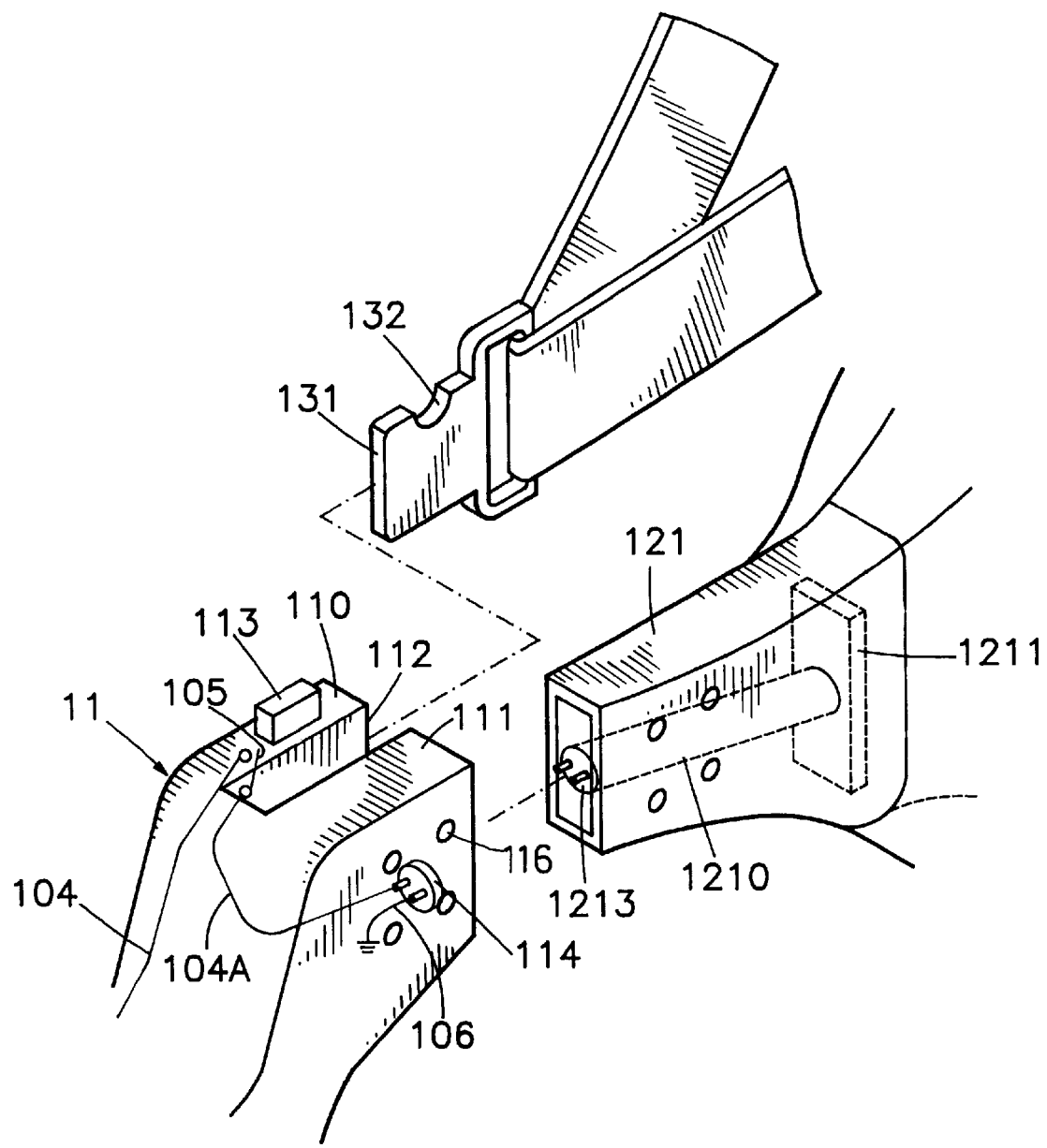
FIG. 3A is a further enlarged view of a portion of the fasten-on supplemental restraint system shown in FIG. 3.

Referring to FIG. 1, the fasten-on supplemental restraint system according to the present invention is incorporated with a mounting console 11. The supplemental restraint system generally comprises a detecting circuit 10 (FIG. 1) and an air bag assembly 12 which can be fastened-on by the user. The air bag assembly 12 includes a housing 122 (FIG. 3) which can be attached to the safety belt 13. An inner shield 124 having a parabola shape is disposed within the housing 122 of the air bag assembly 12. A metal inner sheet 123 is lining within the housing 122. An air bag base 121 is connected to the housing 122. A dynamite pack 1211 and an ignition sensor 1210 are disposed in the air bag base 121. An air bag body 14 is folded and packed within the housing 122. The detecting circuit 10, as shown in FIG. 1, includes a sensor 101 placed within the bumper 100. The detected signal can be transmitted to the ignition sensor 1210 and the dynamite pack 1211 via a connecting wire 104, a normal-open contact 105, connecting wire 104A and the positive terminal of the socket 114 (see FIG. 3). After that, the signal is transmitted to the ground 106 via the negative terminal of the socket 114. Eventually, a complete electric loop is established.

It is quite easy to install the fasten-on supplemental restraint system, even for an amateur like the ordinary car owner. The car owner can choose the suitable air bag assembly that fits his/her own size. While installing the air bag assembly, he or she just simply hold the air bag base 121 and plug it into the receiving socket 111 of the mounting console 11, then lock up two pairs of locking screws 115 into the locking holes 116 on the mounting console 11. And the installation of the air bag assembly is completed. Yet, in order to ensure the safety of the user, the transmission of the signal will not be completed unless the buckle 131 of the safety belt 13 is plugged into the socket 112 of the mounting console 11, which pushes the normal-open contact 105 into a close contact position, then the signal will continue its transmission to the receiving socket 111 of the air bag base 121 of the mounting console 11. By the time the safety belt is buckled up, the circuit 10 will reach the ignition sensor 1210, and an indicator (not shown) within the detecting circuit 10 will light up showing the air bag assembly 12 is in a standby condition and the driver/passenger is protected by this system.

Figure 5:
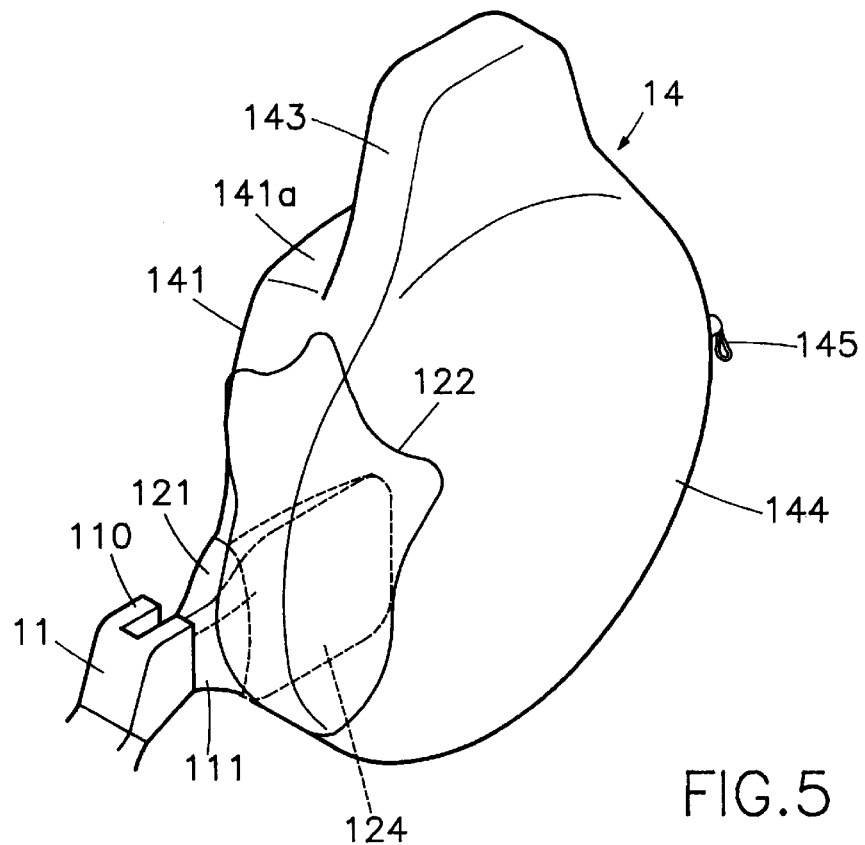
FIG. 5 is a front perspective view of an air bag when it is inflated.
Figure 6:
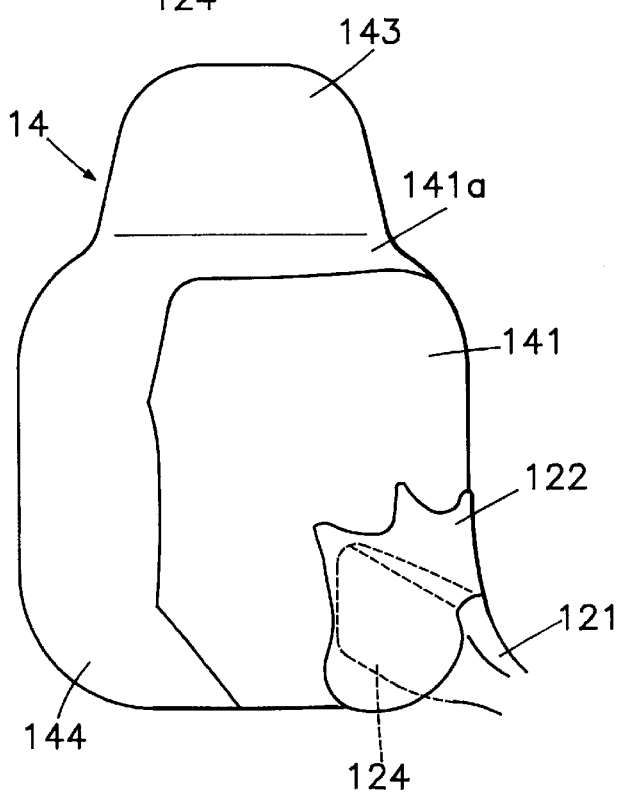
FIG. 6 is a rear perspective view of an air bag when it is inflated.

In order to achieve an active protection, the air bag body 14 is constructed from three different materials, as shown in FIGS. 5 and 6. The inner layer that adjacent to the driver/passenger's body is made of a thicker fire-proof and insulating fabric 141. The outer layer that facing to the steering wheel and/or dashboard is made of a fire-proof durable fabric 144. And the portion above the chest is made of a transparent yet fire-proof and durable fabric 143. In more detail, the thicker fire-proof insulating fabric 141 on the inner layer is similar to the silver fire-proof insulating cloth used by fireman. With this arrangement, when the air bag body 14 is inflated, the expanding and stretching of the air bag body 14 will direct outward from the human body and not inward face to the human body. Thus, the user can be better protected from the possible injured by a secondary shock and/or fire or electrical burn resulting from the collision of the vehicle.

As described above, the outer layer is made of a fire-proof, durable fabric 144. Accordingly, the air bag body 14 is able to protect the driver/passenger from being burned. Furthermore, this layer is more expandable and can guide the stretching of the air bag toward the steering wheel and/or dashboard.

An unique feature of the present invention is using a transparent yet durable and fire-proof plastic fabric to fabricate the upper portion of the air bag body above the chest of the user. With this unique feature, the driver may still keep alert by seeing through this portion even when the air bag is inflated right in front of the driver. Furthermore, the air bag body 14 is designed to be in a special shape so that the air bag body 14 will leave a safe space above the user's chest, as clearly shown in FIGS. 4 and 5. With this arrangement, the face and eyes of the user can be adequately protected from injury during deployment of the air bag body 14. Unlike the conventional air bag, once it is inflated, a large inflated bag is deployed right in front of the driver's face which might block the driver's sight. It is very dangerous since the driver may be panic and lose control of the car by which it may lead to a more serious accident. On the contrary, a safe space 141a is reserved by the air bag body 14 provided by the present invention. Accordingly, the driver could have a better chance not to be panic and would still be able to control the steering of the car. The driver may then make a suitable response to prevent a secondary injury.

The detecting circuit shown in FIG. 1 is similar to the conventional assembly, accordingly, no detailed description is given here. In mounting of the air bag assembly 12, the base 121 of the air bag assembly 12 can be first inserted into the receiving socket 111 of the mounting console 11, then a number of locking screws 115 can be locked up to position the air bag assembly 12.

For usage, the operating procedures are quite simple, first, the buckle 131 of the safety belt 13 can be readily plugged into the socket 112 of the mounting console 11 so that the normal-open contact 105 is closed, then the buckles 128—128 of the air bag strap are attached to the fasteners 129—129 of the shoulder and waist belts of the safety belt 13, then the installation is completed. In this case, the indicator (not shown) of the detecting circuit 10 will be lit up showing the system is in standby condition. Accordingly, the driver is under the protection of the fasten-on supplemental restraint system according to the present invention.

However, in case of a collision occurs at the high speed driving, the sensor 101 disposed within the bumper will detect this collision and initiate a signal. This signal will be transmitted to the base 121 of the air bag assembly 12. Finally, the dynamite 1211 will be ignited through the sensor 1210. Once the dynamite package 1211 is ignited, the air bag body 14 will be quickly inflated and push the crack 1220 of the housing 122 broken and the air bag body 14 will be stretched out and expanded forward and sideways. Meanwhile, the safety belt 13 is further retracted by the explosive force and the inflated air bag body 14 is deployed between the driver and the steering wheel. In the light of this, a safety barrier based from the driver's side is established actively, as clearly shown in FIG. 4.

As described above, the safety belt will be pulled tighter during the deployment of the air bag body 14, and results in holding the driver backward against the seat to diminish the forward inertia resulting from the collision. With this arrangement, the driver can receive a better protection provided by the fasten-on supplemental restraint system according to the present invention. Moreover, the fasten-on supplemental restraint system can be readily applied to replace the existing air bag and pre-tensioner system. As a result, the cost for installing other protective systems will be eliminated.

From the forgoing description, the air bag assembly 12 functions simultaneously with the safety belt 13. The main purpose of this design is to instill the driver into a habit of "buckle-up while driving" which is also mandatory by the existing traffic regulations and rules. Once the safety belt 13 is buckled up, the detecting circuit 10 is activated and the driver is under the protection of the fasten-on supplemental restraint system of the present invention during driving which is similar to the conventional air bag in the steering wheel.

The air bag assembly 12 is readily attachable and detachable to and from the mounting console 11 by means of plug in or unplug the base 121 of air bag. On the other hand, the buckles 128—128 placed at bottom of the housing 122 of the air bag assembly 12 can be readily engaged with the fasteners 129—129 (which is available from the market, thus detailed description is omitted here) of the shoulder and waist belts of the safety belt 13. With this convenient design, air bag assembly can be manufactured into various size to meet the requirements of different users. Accordingly, each driver may select a suitable and adequate air bag assembly 12.

Figure 4:
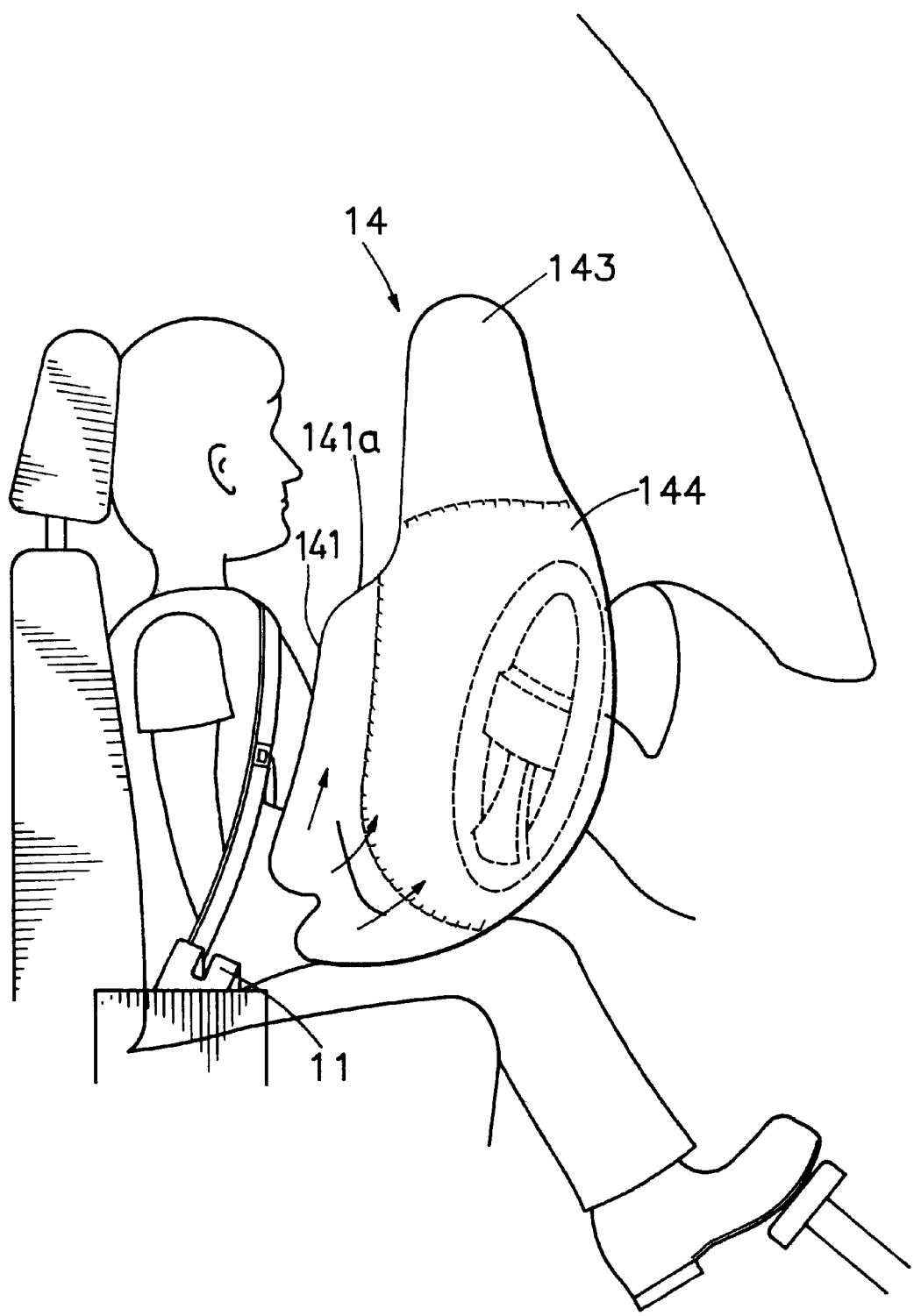
FIG. 4 is a schematic illustration of a fasten-on supplemental restraint system wherein the air bag is inflated.

In order to secure a better cushion, the air bag body 14 is designed into a polygonal shape that could better adapt the conical shape like space between the driver and the steering wheel. It can be divided into three parts for better describing this polygonal air bag body 14. The first part 141 is the area adjacent to the user's chest and abdomen area, i.e. the area from the bottom of the air bag housing upward to the height about 5 cm lower than the shoulder of the user. Then there is an 8 cm wide recess at about the height of the user's shoulder, as a safe space not to hit the jaw of the user. The second part 143 of the air bag body extends upward to cover the user's head and face, and the width of the second part is about 15 cm. The third part 144 is the portion faces to and covers the entire steering wheel. The bottom of the air bag body 14 is only about 5 cm wide and is included in the air bag housing 122. With this arrangement, the conical space between the driver and the steering wheel can be fully covered and filled with the inflated air bag body 14. Accordingly, an active and better protection can be provided for the driver, as shown in FIG. 4. Contrast to the conventional air bag system which holds a potential risk of bumping into user's head and face. The fasten-on air bag according to the present invention reserves a limited yet life-saving space for the user's head and face. This limited reserved space not only ensures the abruptly inflated air bag not to bumping into user's head and face, but also keeps the user's head and chest in place not to dash forward by the inertia movement caused by the sudden impact. Thus this unique design minimizes the potential risk to injure the user's face or eyes. Furthermore, this transparent plastic made air bag may cause less panic to the driver, and consequently the driver can be more calm down to take control of the emergency situation at the sudden collision.

A safeguard protection is provided by the housing 122 of the air bag assembly 12 to ensure the inflated air bag 14 not to hurt the user's body. The housing 122 has a parabola surface 124 which is convex outward and supported by a metal lining 123. Accordingly, once the air bag body 14 is inflated, the direction of expansion and deployment is designated outwardly and forward to overcome the impact resulting from a collision. Furthermore, the lining 123 and the base 121 are made of metal and rigid plastic material. In addition, with the breakage of the crack of the housing 122, the expansion of the air bag body 14 can be properly limited and serve as a protective shield so that the inflated air bag will keep a basic safe distance from the body of the driver. On the other hand, the housing 122 of the air bag assembly 12 is also equipped with a soft pad 126 adjacent to the safety belt 13 and the driver. With this arrangement, the shock and impact resulting from the sudden deployment of the air bag body 14 can be suitably absorbed and reduced. Accordingly, secondary injuries resulting from the deployment of the air bag can be prevented. The air bag body 14 is also fitted with an air discharging device 145 which is located externally and adjacent to the driver's door. The location of the air discharging device 145 is about the windows height and is readily accessible. The air discharging device 145 can be easily pulled to discharge the air contained within the air bag body 14 by either rescuer or the driver himself.

Figure 7:
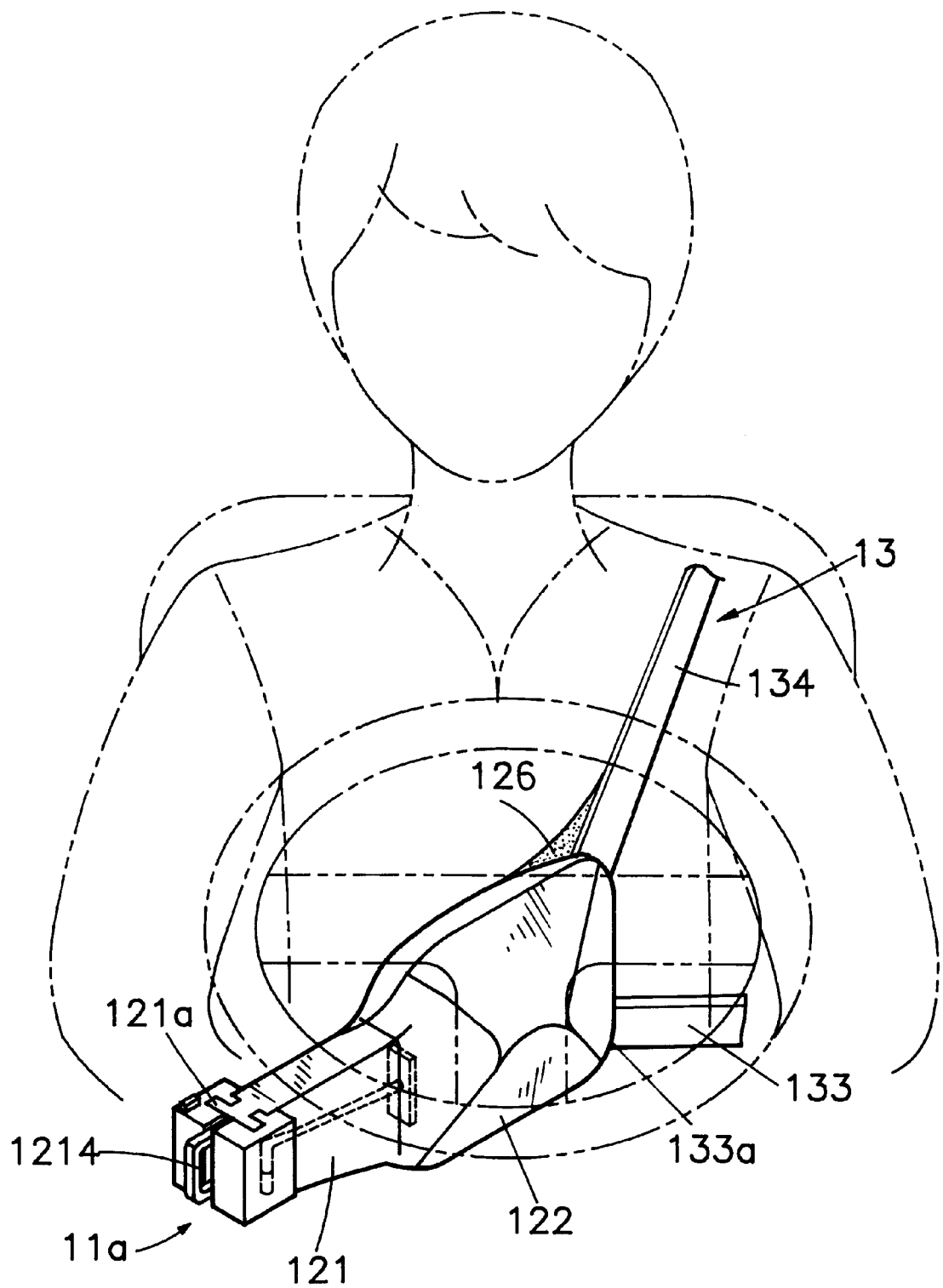
FIG. 7 is a perspective view of another embodiment of the air bag made according to the present invention.
Figure 8:
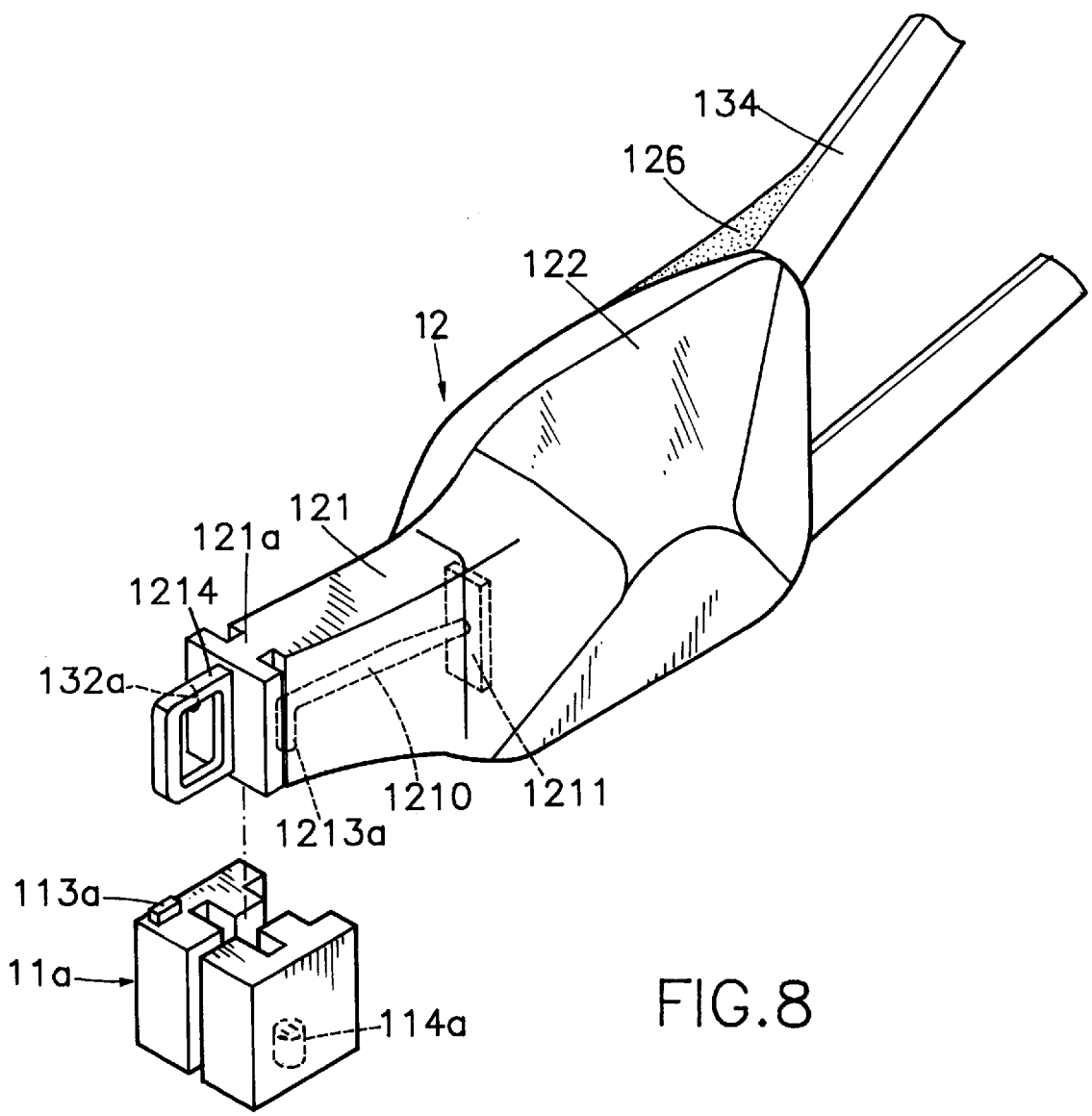
FIG. 8 is an exploded perspective view of the air bag shown in FIG. 7.
Figure 9:
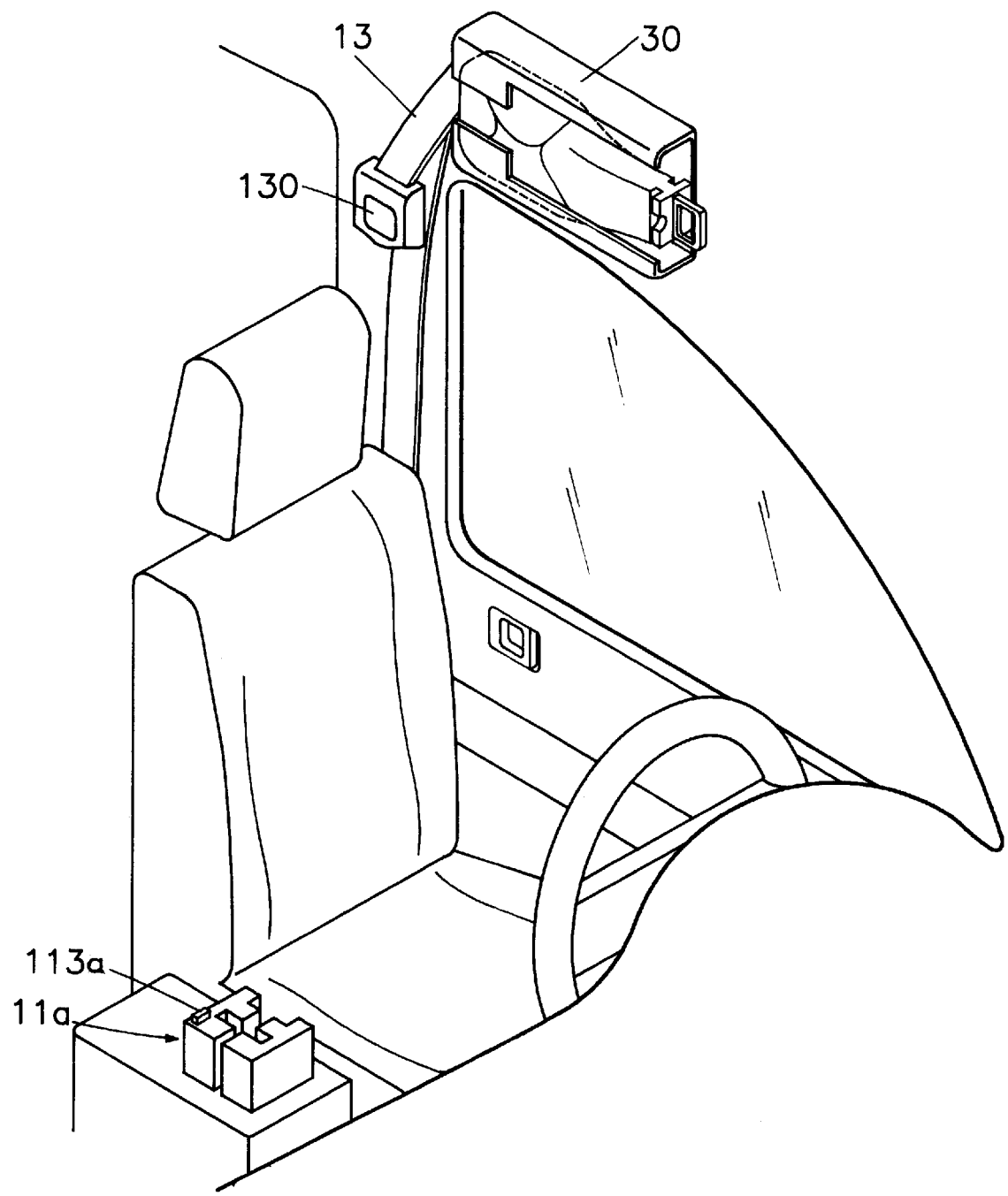
FIG. 9 is a schematic illustration view of the air bag equipped within the car while it is not in use.

The second embodiment of the fasten-on supplemental restraint system is shown in FIGS. 7 to 9, in this preferred embodiment, the air bag assembly is integrated with the safety belt and can be readily set to service via a buckle-fastener arrangement. In the embodiment, the air bag assembly is directly integrated to the buckle portion of the safety belt. The air bag assembly 12 is integrated to the waist belt 133 of the safety belt 13. The original buckle of the safety belt 13 is replaced by a T-shape plug 121*a* modified from the base 121 of the air bag. A buckle ring 1214 is extended from the T-shape plug 121*a*, as shown in FIG. 8. The buckle ring 1214 is very handy for manipulating the air bag assembly 12 by the driver or the passenger. The T-shape plug 121*a* is integrally formed with the housing 122. The upper tail portion of the housing 122 is provided with a soft pad 126 for auxiliary supporting lining. The shoulder belt of the safety belt 13 is attached to the upper end of the supporting lining. The purpose of the supporting lining is to insure the evenly stretching of the shoulder and waist belts so that the safety belt together with the air bag assembly can be more comfortably placed along the front chest of the driver/passenger.

The mounting console 11*a* is also modified to match with the T-shape plug 121*a* of the air bag assembly 12. The T-shape plug 121*a* can be plugged into the mounting console 11*a* from its top. The locking boss (not shown) controlled by the button 113*a* will plug into the recess 132*a* to lock it. The base 121 of the air bag assembly 12 has a built-in ignition sensor 1210 and a dynamite package 1211 of the detecting circuitry 10. This is similar to the first embodiment. However, the connecting wire of the ignition sensor 1210 located within the base extends to the bottom of the base and forms a plug 1213*a*. The plug 1213*a* corresponds to the circuit socket 114*a* of the detecting circuit 10 within the mounting console 11*a*. Once the base 121 is inserted into the mounting console 11a, the plug 1213a and the circuit socket 114a will be connected and establish an electric engagement so that the detecting circuitry 10 is completed and the air bag assembly is in a standby condition. In this embodiment, the T-shape plug 121a of the air bag assembly 12 is inserted into the mounting console 11a from the top. This is used to overcome the back force caused by the explosion of the dynamite package 1211 once it is ignited and also to prevent the centrifugal pulling force during the explosion of the air bag body.

In order to store the air bag assembly 12 when not in use, a receiving box 30 is disposed adjacent to the retracting buckle 130 of the seat belt and above the front door. With this arrangement, the driver may readily retrieve this air bag assembly 12 for application and keep it away when not in use.

According to the design philosophy of the second embodiment of the air bag assembly of the present invention, the deficiencies of the conventional "fixed mounted" air bag can be completely overcome. The air bag assembly can be readily put in service via a buckle-and-fastener arrangement. In addition, the expansion and deployment are directed outward from the driver/passenger. Accordingly, a supplemental protection is positively attained by the provision of the safety belt and the air bag assembly. According to the recent traffic regulations and rules, the driver is mandatory to buckle up while driving. Consequently, the air bag assembly is simultaneously standing by when the safety belt is buckled up. Once the driver is onboard, the driver may hold on the buckle ring 121 of the air bag assembly 12 and retrieve the air bag assembly 12 from the receiving box 30 first, then the driver may insert the T-shape plug 121a into the mounting console 11a and wait for seconds only for the lighting of the indicator (not shown). Once the indicator is lit up, the driver may readily recognize that the air bag assembly 12 is in standby condition and the driver is now under a safe protection.

In the forgoing description, the ignition sensor 1210 and the dynamite package 1211 are only a feasible embodiment, it can be readily appreciated that suitable rapid compressed gas generating device can be used. For example, a rapid compressed gas and an instant actuated valve can be incorporated to deploy and expand the air bag body once a collision occurs. Accordingly, the ignition sensor and the dynamite package are the general terms and shall cover any suitable devices.

From the forgoing description, it can be readily appreciated that the chest, abdomen/waist portions of the driver/passenger can be completely and thoroughly protected by the provision of the air bag assembly of the present invention despite the size of the driver/passenger, the relative distance between the driver/passenger to the steering and the dashboard wheel, and the relative height of the steering wheel and the dashboard. Once the driver/passenger is onboard and buckle up the safety belt, the air bag assembly is located in front of the driver/passenger. In case of collision the air bag assembly is inflated and deployed forward and outward immediately without the possibility of hurting the driver/passenger. With this system an user-friendly and safer air bag assembly is provided. Once the air bag has expanded between the driver/passenger and the steering wheel and dashboard, the safety belt is further tensioned to hold the driver/passenger back to the seat and an active protection of the driver/passenger is attained. As the inner portion of the housing of the air bag assembly provides a positioning function to the safety belt, a basic safety distance is provided. In addition, the housing is also protected by a metal lining. With this arrangement, once the air bag body is deployed, a safe distance is still retained between the air bag body and the safety belt. This safe distance in turn provides a flexible safe distance to the user once the air bag body is expanded. Consequently, injury to the driver/passenger resulting from sudden expansion and deployment of the air bag body is eliminated. Even if a shorter person is in the seat or a passenger with glasses, no harm nor injury will be happened to the driver/passenger during the sudden expansion of the air bag body.

The fasten-on supplemental restraint system combines the active air bag assembly and the passive safety belt in a simple and compact manner. On the other hand, the functions of the safety belt tensioning device and the passenger seat sensor are also provided by this fasten-on supplemental restraint system. Both the driver/passenger are well protected by the supplemental restraint system of the present invention during driving.

While particular embodiments of the present invention have been illustrated and described, it would be obvious to those skilled in the art that various changes and modifications can be made without departing from the spirit and scope of the invention. It is therefore intended to cover in the appended claims all such changes and modifications that are within the scope of the present invention.

I claim:

1. A fasten-on supplemental restraint system, comprising a detecting circuit, a mounting console disposed adjacent to the driver's seat and an air bag assembly, said air bag assembly including a housing, an air bag base being connected to said housing, an air bag body being disposed within said housing, a rapidly compressed gas generating device being disposed within said housing and a retaining device for retaining said base onto the safety belt, said air bag base being attached into said mounting console so that a plug of said rapidly compressed gas generating device is electrically engaged with a socket of said detecting circuit provided in said mounting console, wherein when the driver is onboard and buckles up the safety belt, said buckle of the safety belt may be readily inserted into the fastener such that the normal open contact of said detecting circuit is closed by said buckle of said safety belt and said air bag assembly is set in a standby condition and is ready to protect the driver/passenger once a collision occurs.

2. A fasten-on supplemental restraint system as recited in claim 1, wherein said air bag body comprises a fire-proof insulating fabric adjacent to the driver/passenger, an external layer adjacent to the steering wheel and/or dashboard made from fire-proof durable fabric, and a clear, durable and fire-proof fabric located above the chest portion of the user and said air bag body can be readily folded.

3. A fasten-on supplemental restraint system as recited in claim 1, wherein said housing has a parabola surface adjacent to the driver/passenger and which is supported by a metal lining so that once said air bag body is deployed and exploded, the direction of deploying and expanding is directed outward and forward to overcome the impacting force coming from collision, said safety belt is further tensioned, consequently and the driver/passenger receives a complete protection.

4. A fasten-on supplemental restraint system as recited in claim 1, wherein upon being inflated, the middle and lower portions of said air bag body is disposed between the steering wheel and the driver, the upper portion of said inflated air bag body is transparent such that the vision of the driver will not be blocked and the driver may control the car, furthermore, an ample space is kept between the head of the driver and the upper portion of said air bag body.

5. A fasten-on supplemental restraint system, comprising a detecting circuit, a mounting console disposed adjacent to the driver's seat and an air bag assembly, characterized in that said air bag assembly includes a housing, an air bag base connected to said air bag housing, a folded air bag body being disposed within said housing, a rapidly compressed gas generating device being disposed within said housing, a waist belt of the safety belt being integrally assembled with said air bag assembly, a buckle portion combining the buckle of the safety belt and the base of said air bag assembly, a buckle ring extended from said buckle, a receiving socket disposed at said mounting console, wherein said buckle can be readily inserted into said receiving socket from the top, a retaining boss being provided to insert into a recess of said buckle to lock it, a plug of said rapidly compressed gas generating device being built-in said housing and extended downward to the bottom of said housing, a socket of said detecting circuit being disposed within said mounting console, wherein when the driver/passenger is onboard, said plug of said compressed gas generating device is electrically engaged with said socket of said detecting circuitry within said mounting console such that said air bag assembly is set to a standby condition and the driver/passenger can be completely protected.

6. A fasten-on supplemental restraint system as recited in claim 5, wherein said air bag body comprises a fire-proof insulating fabric adjacent to the driver/passenger, an external layer adjacent to the steering wheel and/or dashboard made from fire-proof durable fabric, and a clear, durable and fire-proof fabric located above the chest portion of the user and said air bag body can be readily folded.

7. A fasten-on supplemental restraint system as recited in claim 5, wherein said housing has a parabola surface adjacent to the driver/passenger and which is supported by a metal lining so that once said air bag body is deployed and exploded, the direction of deploying and expanding is directed outward and forward to overcome the impacting force coming from collision, said safety belt is further tensioned, consequently and the driver/passenger receives a complete protection.

8. A fasten-on supplemental restraint system as recited in claim 5, wherein upon being inflated, the middle and lower portions of said air bag body is disposed between the steering wheel and the driver, the upper portion of said inflated air bag body is transparent such that the vision of the driver will not be blocked and the driver may control the car, furthermore, an ample space is kept between the head of the driver and the upper portion of said air bag body.

* * * * *